United States Patent
Lai

(10) Patent No.: US 10,747,437 B2
(45) Date of Patent: Aug. 18, 2020

(54) SAS HARD DISK DRIVE UPDATE VIA MANAGEMENT CONTROLLER

(71) Applicant: QUANTA COMPUTER INC., Taoyuan (TW)

(72) Inventor: Te-Hsien Lai, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 116 days.

(21) Appl. No.: 15/584,589

(22) Filed: May 2, 2017

(65) Prior Publication Data

US 2018/0321854 A1 Nov. 8, 2018

(51) Int. Cl.
| | |
|---|---|
| *G06F 9/44* | (2018.01) |
| *G06F 9/445* | (2018.01) |
| *G06F 3/06* | (2006.01) |
| *G06F 8/65* | (2018.01) |
| *G06F 8/654* | (2018.01) |
| *G06F 8/656* | (2018.01) |
| *G06F 9/02* | (2006.01) |

(52) U.S. Cl.
CPC .......... *G06F 3/0607* (2013.01); *G06F 3/0632* (2013.01); *G06F 3/0689* (2013.01); *G06F 8/65* (2013.01); *G06F 8/654* (2018.02); *G06F 8/656* (2018.02); *G06F 8/66* (2013.01); *G06F 3/064* (2013.01); *G06F 3/0659* (2013.01); *G06F 9/02* (2013.01)

(58) Field of Classification Search
None
See application file for complete search history.

(56) References Cited

U.S. PATENT DOCUMENTS

| | | | |
|---|---|---|---|
| 6,996,819 B1 * | 2/2006 | Alanis | G06F 8/60 717/173 |
| 7,373,366 B1 | 5/2008 | Chatterjee et al. | |
| 8,046,534 B2 | 10/2011 | Xu et al. | |
| 8,219,794 B1 | 7/2012 | Wang et al. | |
| 2006/0218364 A1 | 9/2006 | Kitamura | |
| 2006/0277328 A1 | 12/2006 | Cherian et al. | |
| 2007/0005871 A1 | 1/2007 | Zimmer et al. | |
| 2007/0168571 A1 | 7/2007 | Ramsey et al. | |
| 2010/0058322 A1 | 3/2010 | Oikawa et al. | |

(Continued)

FOREIGN PATENT DOCUMENTS

| | | |
|---|---|---|
| JP | 2004287979 A | 10/2004 |
| JP | 2010108174 A | 5/2010 |
| TW | 200949701 A | 12/2009 |

OTHER PUBLICATIONS

JP Office Action for Application No. 2017-234179, dated Mar. 12, 2019, w/ First Office Action Summary.

(Continued)

*Primary Examiner* — Tanh Q Nguyen
(74) *Attorney, Agent, or Firm* — Nixon Peabody LLP

(57) ABSTRACT

Methods and systems of updating serial attached small computer system interface (SAS)/serial advanced technology attachment (SATA) hard disk drive (HDD) firmware (FW) using a management controller (MC) are provided. The method includes uploading the HDD FW to the MC via the local area network (LAN), breaking the HDD FW into a plurality of chunks, issuing a plurality of write commands and writing the plurality of chunks into the SAS HDD.

8 Claims, 7 Drawing Sheets

(56) References Cited

U.S. PATENT DOCUMENTS

| | | |
|---|---|---|
| 2010/0106905 A1 | 4/2010 | Kurashige et al. |
| 2011/0119686 A1 | 5/2011 | Chen |
| 2016/0210132 A1 | 7/2016 | Gerhart et al. |
| 2017/0046152 A1 | 2/2017 | Shih et al. |
| 2017/0102952 A1* | 4/2017 | Khemani ............ G06F 13/4282 |
| 2018/0314507 A1* | 11/2018 | Chien ..................... G06F 8/61 |
| 2018/0321854 A1* | 11/2018 | Lai .......................... G06F 8/654 |

OTHER PUBLICATIONS

ORACLE, Solaris 10 1/13; on-line Mar. 2013; pp. 20 to 21, Internet URL: https://docs.oracle.com/cd/E38900_01/pdf/E38771.pdf.
Extended European Search Report for EP Application No. 17205664.0, dated May 17, 2018.

\* cited by examiner

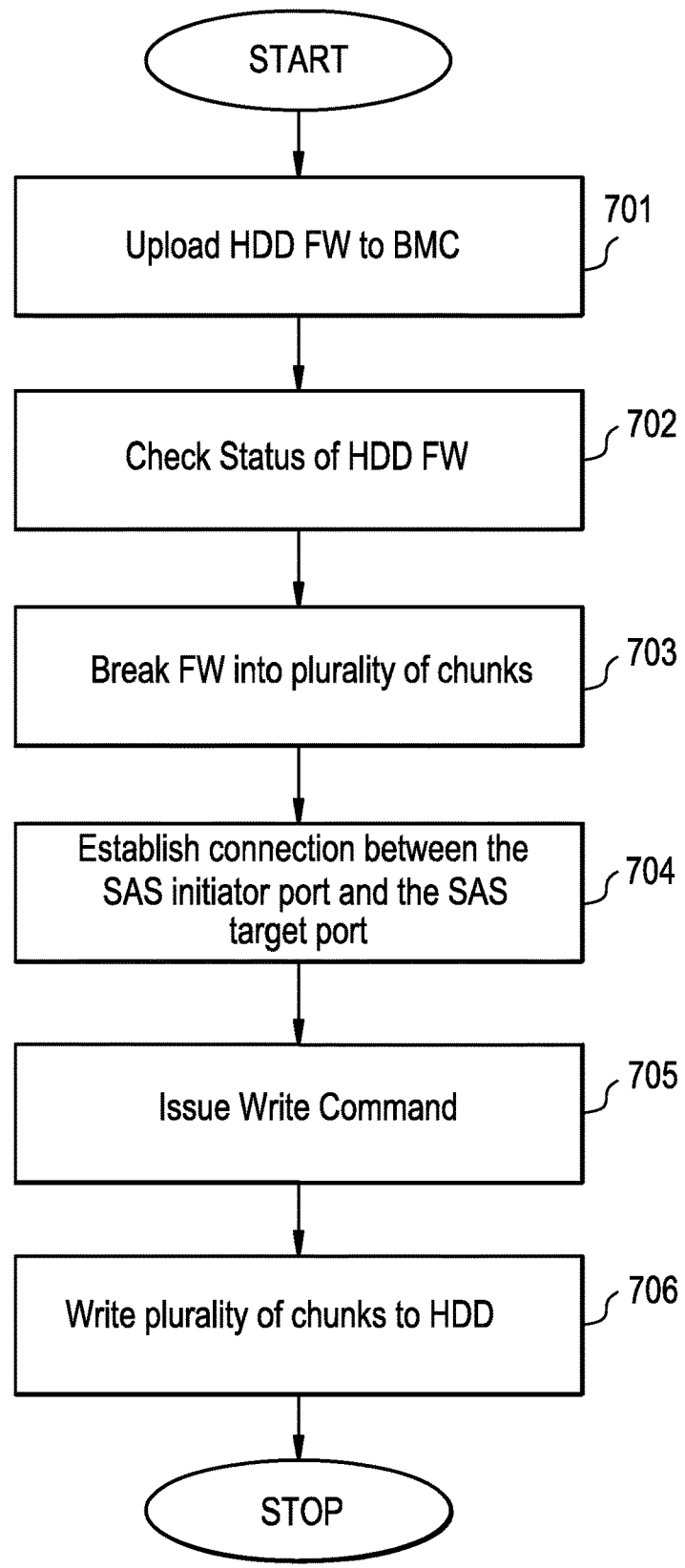

SAS HARD DISK DRIVE UPDATE VIA MANAGEMENT CONTROLLER

FIELD

This application relates to methods and systems for updating Hard Disk Drive (HDD) Firmware (FW) via a Management Controller (MC).

BACKGROUND

In the conventional technology, serial attached small computer system interface (SAS)/serial advanced technology attachment (SATA) HDD/SSD vendors or computer manufacturers provide their own HDD FW update tool running on in-band operating system (OS) to update HDD FW. Exemplary embodiments of some such tools are HP SUM (Smart Update Manager) and Dell DUP (Dell Update Packages). However, all conventional methods and systems for updating HDD FW require dealing with several different kinds of OS, thereby leading to multiple complications and management problems such as compliance with different kinds of OS, support for the several versions of the different kinds of OS etc.

None of the available tools in the conventional technology use the MC out of band (OOB) management to update the HDD FW or reduce the above described complications and management problems. Accordingly, there is a need for another solution for updating the HDD FW via BMC OOB.

SUMMARY

The following presents a simplified summary of one or more embodiments in order to provide a basic understanding of the present technology. This summary is not an extensive overview of all contemplated embodiments of the present technology, and is intended to neither identify key or critical elements of all examples nor delineate the scope of any or all aspects of the present technology. Its sole purpose is to present some concepts of one or more examples in a simplified form as a prelude to the more detailed description that is presented later.

In a first embodiment, there is provided a method of updating a serial attached small computer system interface (SAS) hard disk drive (HDD) firmware (FW) using a management controller (MC). The method, performed by the MC, includes uploading the HDD FW via the local area network (LAN), breaking the HDD FW into a plurality of chunks, issuing a plurality of small computer system interface (SCSI) Write Buffer commands with the plurality of chunks, and writing the plurality of chunks into the SAS HDD.

The method further includes establishing a connection between a serial attached SAS initial port and an SAS target port.

In the method, the plurality of SCSI Write Buffer commands are issued one by one.

In the method, a first SCSI Write Buffer command with a first chunk from among the plurality of SCSI Write Buffer commands with the plurality of chunks is issued prior to establishing the connection between the SAS initial port and the SAS target port, and the first chunk is written into the SAS HDD once the connection between the SAS initial port and the SAS target port is established.

In the method, the plurality of SCSI Write Buffer commands with the plurality of chunks are issued through an inter-integrated circuit (I2C).

The method further includes determining if the update of the HDD FW is complete, and terminating the connection between the SAS initial port and the SAS target port based on the determination.

In the method, the plurality of SCSI Write Buffer commands with the plurality of chunks are issued through a Management Component Transfer Protocol (MCTP) over Peripheral Component Interconnect Express (PCIe).

In the method, if the SAS HDD is going through an Expander, the establishing comprises establishing the connection between the SAS initial port and the SAS target port through the Expander.

In a second embodiment, there is provided a method of updating a serial advanced technology attachment (SATA) hard disk drive (HDD) firmware (FW) using a management controller (MC). The method, performed by the MC, includes uploading the HDD FW via the local area network (LAN), breaking the HDD FW into a plurality of chunks, issuing a plurality of small computer system interface (SCSI) advanced technology attachment (ATA) PASS-THROUGH commands with DOWNLOAD MICROCODE ATA commands and the plurality of chunks, and writing the plurality of chunks into the SATA HDD.

The method further includes establishing a connection between a serial attached small computer system interface (SAS) initial port and an SAS target port.

In the method, the plurality of SCSI ATA PASS-THROUGH commands with DOWNLOAD MICROCODE ATA commands are issued one by one.

In the method, a first SCSI ATA PASS-THROUGH command with DOWNLOAD MICROCODE ATA command and a first chunk from among the plurality of SCSI ATA PASS-THROUGH commands with DOWNLOAD MICROCODE ATA commands and the plurality of chunks is issued prior to establishing the connection between the SAS initial port the SAS target port, and the first chunk is written into the SATA HDD once the connection between the SAS initial port and the SAS target port is established.

In the method, the plurality of SCSI ATA PASS-THROUGH commands with DOWNLOAD MICROCODE ATA commands and the plurality of chunks are issued through an inter-integrated circuit (I2C).

The method further includes determining if the update of the HDD FW is complete, and terminating the connection between the SAS initial port and the SAS target port based on the determination.

In the method, the plurality of SCSI ATA PASS-THROUGH commands with DOWNLOAD MICROCODE ATA commands and the plurality of chunks are issued through a Management Component Transfer Protocol (MCTP) over Peripheral Component Interconnect Express (PCIe).

In the method, the SAS initial port is a Host Bus Adapter (HBA) and the SAS target port is an Expander.

In a third embodiment, there is provided a system for updating a serial attached small computer system interface (SAS) hard disk drive (HDD) firmware (FW). The system includes a management controller (MC), the SAS HDD, and a management software (SW), wherein the management SW is configured to upload the SAS HDD FW to the MC, and wherein the MC is configured to break the uploaded HDD FW into a plurality of chunks and issue a write command to write the plurality of chunks in the SAS HDD.

In a fourth embodiment, there is provided a system for updating serial advanced technology attachment (SATA) hard disk drive (HDD) firmware (FW). The system includes a management controller (MC), the SATA HDD, and a management SW, wherein the management SW is configured to upload the SATA HDD FW to the MC, and wherein the MC is configured to break the uploaded HDD FW into a plurality of chunks and issue a write command to write the plurality of chunks in the SAS HDD.

BRIEF DESCRIPTION OF THE DRAWINGS

These and other sample aspects of the present technology will be described in the detailed description and the appended claims that follow, and in the accompanying drawings, wherein:

FIG. 7 depicts a flow chart describing the process for updating the HDD FW using BMC OOB.

DETAILED DESCRIPTION

The subject disclosure provides techniques for managing network configurations in a server system, in accordance with the subject technology. Various aspects of the present technology are described with reference to the drawings. In the following description, for purposes of explanation, numerous specific details are set forth in order to provide a thorough understanding of one or more aspects. It can be evident, however, that the present technology can be practiced without these specific details. In other instances, well-known structures and devices are shown in block diagram form in order to facilitate describing these aspects. The word "exemplary" is used herein to mean "serving as an example, instance, or illustration." Any embodiment described herein as "exemplary" is not necessarily to be construed as preferred or advantageous over other embodiments.

One having ordinary skill in the relevant art, however, will readily recognize that the invention can be practiced without one or more of the specific details or with other methods. In other instances, well-known structures or operations are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

As discussed above, there is significant interest in solution for updating the HDD FW via MC OOB. In view of the foregoing, the present disclosure describes updating of the HDD FW using illustration depicted in FIGS. 1-7. Several exemplary embodiments are described hereinafter with reference to a baseboard management controller (BMC). However, please note that the scope of the disclosure is not limited thereto and any management controller may be used to update the HDD FW.

Figure 1:
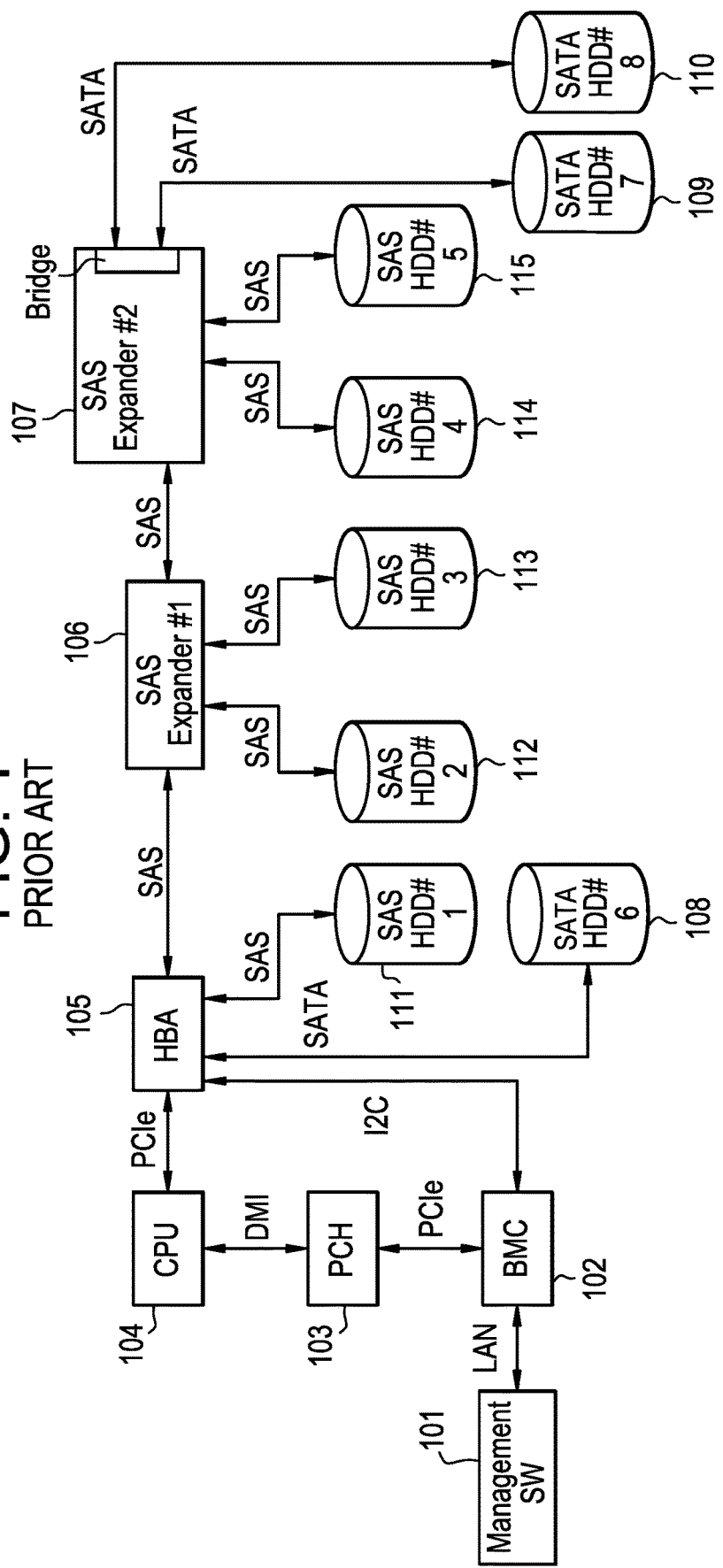
FIG. 1 illustrates conventional topology of the SAS/SATA HDD.

FIG. 1 illustrates conventional topology of the SAS/SATA HDD.

As depicted in FIG. 1, SAS topology consists of all the SAS devices that can interact with each other. The topology consists of two portions, one being the end devices, and the other being the service delivery subsystems. Exemplary embodiments of the end devices include SAS initiators which issue commands and the SAS targets which execute those commands. Exemplary embodiments of the service delivery subsystem include expander and cables. Hereinafter, the term "expander" refers to both the SAS expander and cables associated with the expander.

SAS uses a connection-based protocol. Accordingly, prior to sending a command, the SAS initiator must establish a connection, by making a connection request, and the SAS target must respond to the connection request. The communication from the SAS initiator includes transmission of commands and data and the communication from the SAS target includes transmission of data and status update. Upon completion of the SAS initiators tasks, the connection between the SAS initiator and the SAS target is terminated.

The connection between the SAS initiator is carried via ports and each port has a port address. All SCSI and SATA transfers are performed using port addresses, wherein each port is composed of one or more physical layers (PHYs).

The capability of a host bus adapter (HBA) includes handling serial SCSI protocol (SSP)/SATA tunneled protocol (STP)/serial management protocol (SMP) transport layer requirement from Peripheral Component Interconnect Express (PCIe) interface (I/F). The different protocols are defined in more details hereinafter.

SSP defines how the SAS transport transfers SCSI commands, data, responses (status) and control between the SAS initiator and the SAS target.

STP allows an ATA device driver in a host to talk to a SATA HDD over the SAS service delivery subsystem. STP further defines how the SAS transport transfers ATA commands, data, status and control between the SAS enabled SATA host and the SATA device. The SATA device is unaware of the SAS environment and the translation is done via SAS to the SATA Bridge in the Expander.

SMP defines how an SAS initiator can configure and maintain the Expanders and SAS service delivery subsystem.

Further capabilities of a host bus adapter (HBA) and expander are described below.

When the power is on, both SAS/SATA HDD may handshake with the expander and assist the expander to establish the routing table, where the routing table is a mapping table to show which HDD is connected to which PHY port. HBA may use the SMP protocol to hand the management off to the expander. The HBA may use the SSP protocol to hand off the connection management, and transfer SCSI commands, data and status, to the SAS HDD directly attached. The HBA may use the SSP protocol to hand off the connection management, and transfer SCSI commands, data and status, to the SAS HDD behind the expander, where the expander has a routing table for passing the frames to the target SAS HDD. The HBA may use the STP protocol to hand off the connection management and transfers ATA commands, data and status, to the SATA HDD behind expander, where the expander has a routing table to pass the frame to the target SATA HDD.

The expander is similar to the network switches or routers, as it routes frames from the source PHY to the destination PHY using a routing table. An expander which is directly attached with the SATA HDD can include a SAS to SATA Bridge. On the CPU end is an emulated SAS device and includes connection management and represents a SAS address on behalf of SATA device. On the other end is an emulated SATA Host which is configured to communicate with the real SATA device 109, 110.

As can be seen in the exemplary embodiment of the topology of the SAS/SATA HDD, there is depicted a management software (SW) 101, connected via LAN to the BMC 102. The BMC 102 communicates with the platform controller hub (PCH) 103 via PCIe and to the HBA 105 via inter-integrated circuit (I2C), according to an exemplary embodiment. The topology further includes a CPU 104, a plurality of SAS expanders 106, 107, a bridge, SAS HDDs 111-115 and SATA HDDs 108-110.

According to an exemplary embodiment of the functionality of the routing table, in view of FIG. 1, PHY ID 2 of the SAS Expander#1 106 is connected to SAS HDD#2 112 while PHY ID 3 of the SAS Expander#1 106 is connected to SAS HDD#3 113. Accordingly, if the HBA 105 attempts to access the data on the SAS HDD#2 112, the SAS frame (SCSI command) coming from HBA 105 to the SAS Expander#1 106 will be forwarded to PHY ID 2 based on the routing table, thereby causing the frame to go out to the correct device, i.e. SAS HDD#2 112.

Figure 2:
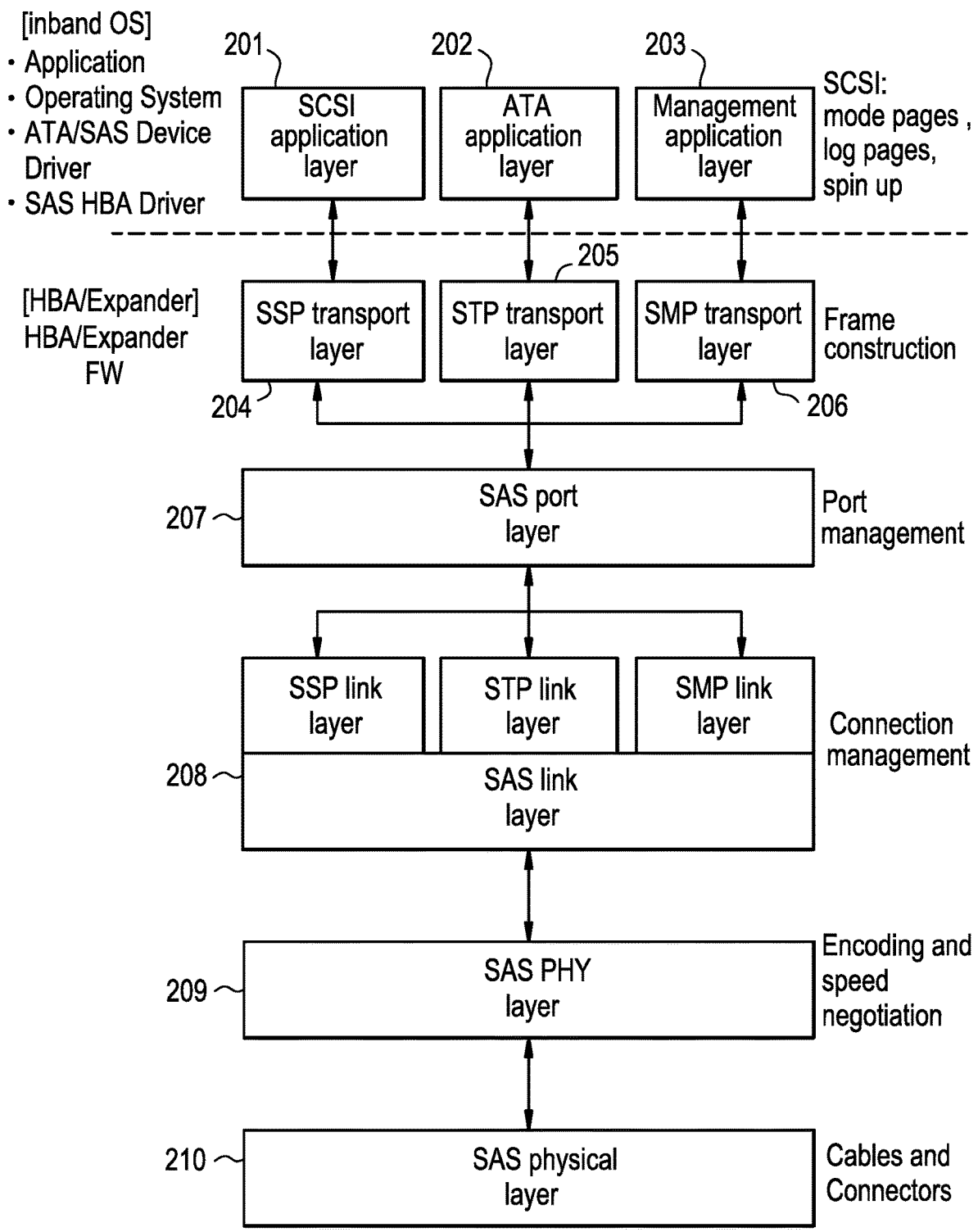
FIG. 2 illustrates an SAS protocol stack from an in-band OS point of view, to update HDD FW, in the prior art.

FIG. 2 illustrates an SAS protocol stack from an in-band OS point of view, to update HDD FW, in the prior art.

The HBA FW includes SSP/STP/SMP transport layers 204, 205, 206 and lower layers to communicate with the expander, SAS HDD and SATA HDD (the SAS emulated HDD on behalf of the SATA HDD). The SAS expander FW includes link layer and lower layers, with a primary focus on routing frames upon the routing table. The SAS Expander FW includes the SAS to SATA Bridge.

The SAS HDD FW includes a SCSI application layer 201 in order to communicate with a counterpart SCSI application and the SATA HDD FW includes an ATA application layer 202 in order to communicate with counterpart SATA application.

The in-band SAS HDD FW update process, according to the prior art, comprises the expander discovering the SAS HDD and establishing the routing table when the power is on. This is followed by making sure that the SAS HDD FW is working without problem and updating the FW by breaking it into many blocks and issuing the first SCSI Write Buffer command with the first block through PCIe.

According to the prior art, the connection between the SAS initiator port and the SAS target port is first established. For a SAS HDD, the connection is between the HBA (SAS initiator port) and the SAS HDD (SAS target port) 207. If the SAS HDD is going through the nearby expander 106, 107, then the connection goes to the target SAS HDD through the nearby expander 106, 107 upon the routing table.

Once the connection is established, the first block is written into the SAS HDD through the connection.

The in-band SAS HDD FW update process further includes issuing subsequent SCSI Write Buffer command with subsequent blocks one by one through PCIe and the connection, to update SAS HDD FW. Once the update has been completed, the connection is terminated.

The in-band SATA HDD FW update process includes the expander discovering the SATA HDD and establishing the routing table. The process further includes making sure that the SATA HDD FW is working without a problem, when the power is on. The process then includes updating the FW by breaking it into many blocks and issuing the first SCSI ATA pass-through command with download microcode ATA command and first block in it through PCIe.

The connection between SAS initiator port and SAS target port is first established. For a SATA HDD the connection is established between the HBA (STP initiator port) and the expander (STP target port).

Once the connection is established, the first block is written into the SATA HDD through the connection.

The in-band SATA HDD FW update process further includes issuing subsequent SCSI ATA pass-through commands with download microcode ATA command and subsequent blocks one by one through PCIe and the connection, to update the SATA HDD FW. Once the update has been completed, the connection is terminated.

In the art, the HDD controller loads the FW image from flash to the memory, when the power is on, and the FW runs on the memory. When performing FW upgrade, the HDD controller receives uploading FW image via SCSI command (SCSI Write Buffer command or SCSI ATA pass-through command) and then programs it into flash. Thus, the in-band OS or application can still access HDD data since that access is also available via SCSI commands. However, the access SCSI commands may fail since the controller can only handle one SCSI command at a time. Accordingly, the HDD need not be put into an off-line mode.

FIG. 2 further depicts management application layer 203 along with the SCSI application layer 201 and the ATA application layer 202, connection management layer 208 comprising the SSP/STP/SMP link layer and the SAS link layer, the SAS PHY layer 209 for encoding and speed negotiation and SAS physical layer 210 comprising cables and connectors, all of which are well known in the art.

Figure 3:
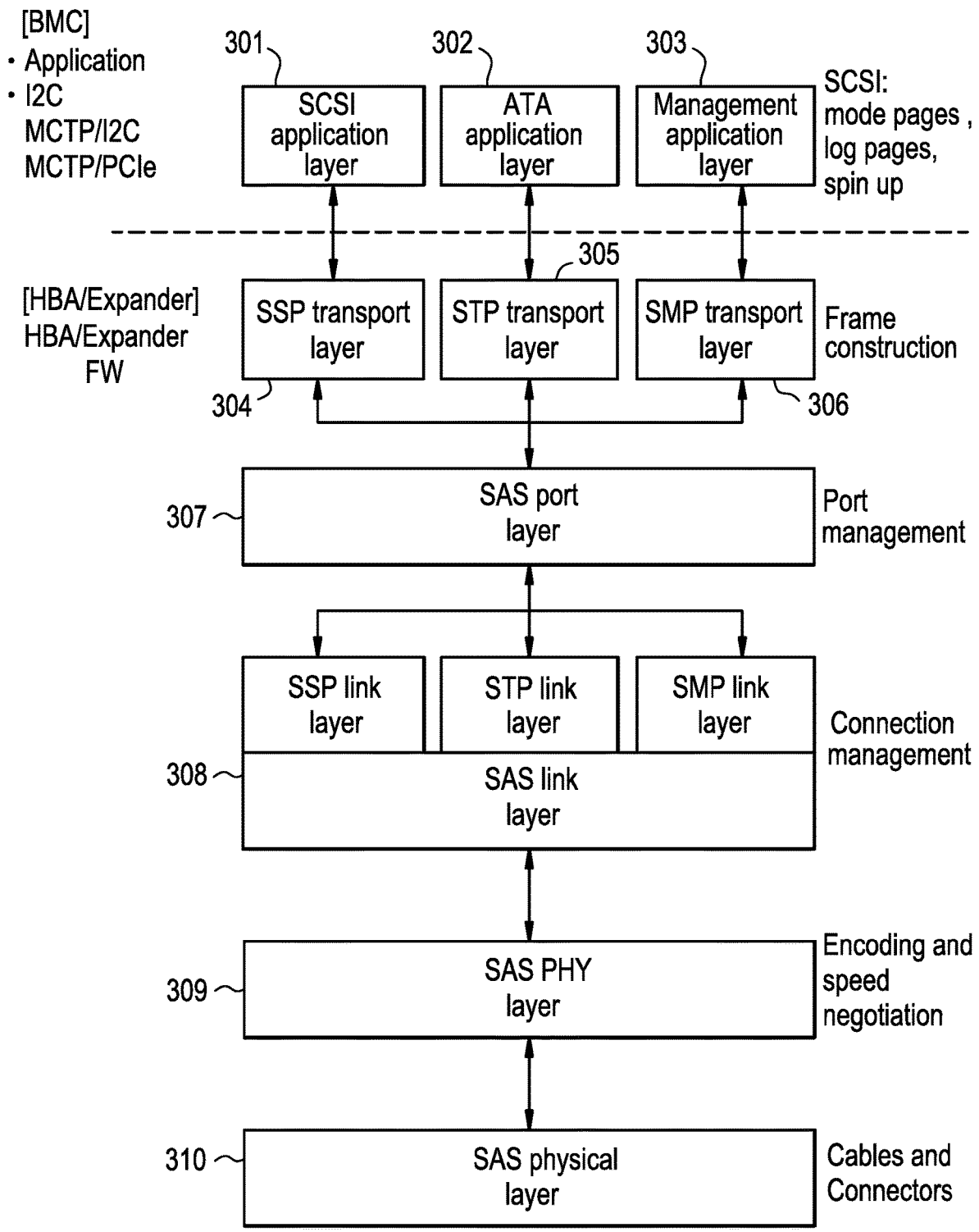
FIG. 3 illustrates an SAS protocol stack from a BMC point of view to update HDD FW, according to an exemplary embodiment.

FIG. 3 illustrates an SAS protocol stack from a BMC point of view to update HDD FW, according to an exemplary embodiment.

The current disclosure is directed towards replacing the application layer from in-band OS to BMC, thereby describing the use of BMC OOB to update the HDD FW. Such a replacement prevents from dealing with several different kinds of OS, in turn preventing multiple complications and management problems such as compliance with different kinds of OS, support for the several versions of the different kinds of OS etc.

Described herein below are processes and systems for updating the HDD FW using the BMC via two different kinds of connections. The description begins with the process for updating the SAS HDD FW and the SATA HDD FW using the BMC via I2C connection. Following that, process for updating the SAS HDD FW and the SATA HDD FW using the BMC via PCIe connection is recited.

The SAS protocol stack from the BMC point of view, as shown in FIG. 3, depicts an HBA which is configured to handle SSP/STP/SMP transport layer 304, 305, 306 requirement via I2C and PCIe connections. As can be seen in FIG. 3, the application layer, which comprises the SCSI 301, ATA 302 and management layer 303, is replaced from an in-band OS to BMC. The BMC in-turn communicated with the SSP/STP/SMP transport layer 304, 305, 306. The other lower layer which follows comprises the SAS port layer 307, SSP/STP/SMP link layer 308, SAS link layer 308, the SAS PHY layer 309 and the SAS physical layer 310, which are all well known in the art.

The process for updating the SAS HDD FW and the SATA HDD FW via I2C connection is described below.

To update the SAS HDD FW using the BMC OOB via I2C connection, the management software (SW) uploads the HDD FW to BMC via LAN, according to an exemplary embodiment. The BMC then checks the SAS HDD FW to make sure the FW is working without any problems.

The BMC then breaks down the firmware into a plurality of chunks and issues the first SCSI Write Buffer command with the first chunk through I2C.

First, the connection between the SAS initiator port and the SAS target port is established. For the SAS HDD the connection is between the HBA (SAS initiator port) and the SAS HDD (SAS target port). If the SAS HDD goes through the nearby Expander, then the connection goes to the target SAS HDD through the nearby Expander upon the routing table.

Once the connection is established, the first chunk is written into the SAS HDD. Following that, the BMC issues subsequent SCSI Write Buffer command with subsequent chunk one by one through I2C and the connection, to update SAS HDD FW.

Once the update has been completed, the connection is terminated.

To update the SATA HDD FW using the BMC OOB via I2C connection, the management software (SW) uploads the HDD FW to BMC via LAN, as in the above described process, according to an exemplary embodiment. The BMC then checks the SATA HDD FW to make sure the FW is working without any problems.

The BMC then breaks down the firmware into a plurality of chunks and issues the first SCSI ATA pass-through command with download microcode ATA command and the first chunk in it, through I2C.

First, the connection between the SAS initiator port and the SAS target port is established. For the SATA HDD the connection is between the HBA (STP initiator port) and the expander (STP target port).

Once the connection is established, the first chunk is written into the SATA HDD. Following that, the BMC issues subsequent SCSI ATA pass-through commands with download microcode ATA commands and the subsequent chunks in it through I2C and the connection, to update SATA HDD FW.

Once the update has been completed, the connection is terminated.

The process for updating the SAS HDD FW and the SATA HDD FW via PCIe connection is described below.

To update the SAS HDD FW using the BMC OOB via PCIe connection, when the power is on, the MCTP bus owner, Intel management engine (ME), discovers and assigns Endpoint ID (EID) to the MCTP enabled hardware component, which in this case is the BMC and the HBA. Each EID allows direct peer to peer communication between the MCTP enabled hardware components.

The management software (SW) uploads the HDD FW to BMC via LAN, according to an exemplary embodiment.

The BMC then checks the SAS HDD FW to make sure the FW is working without any problems.

The BMC then breaks down the firmware into a plurality of chunks and issues the first SCSI Write Buffer command with the first chunk through MCTP over PCIe.

First, the connection between the SAS initiator port and the SAS target port is established. For the SAS HDD the connection is between the HBA (SAS initiator port) and the SAS HDD (SAS target port). If the SAS HDD goes through the nearby Expander, then the connection goes to the target SAS HDD through the nearby Expander upon the routing table.

Once the connection is established, the first chunk is written into the SAS HDD. Following that, the BMC issues subsequent SCSI Write Buffer command with subsequent chunk one by one through MCTP over PCIe and the connection, to update SAS HDD FW.

Once the update has been completed, the connection is terminated.

To update the SATA HDD FW using the BMC OOB via PCIe connection, when the power is on, the MCTP bus owner, Intel management engine (ME), discovers and assigns Endpoint ID (EID) to the MCTP enabled hardware component, which in this case is the BMC and the HBA. Each EID allows direct peer to peer communication between the MCTP enabled hardware components.

The management software (SW) uploads the HDD FW to BMC via LAN, as in the above described process, according to an exemplary embodiment. The BMC then checks the SATA HDD FW to make sure the FW is working without any problems.

The BMC then breaks down the firmware into a plurality of chunks and issues the first SCSI ATA pass-through command with download microcode ATA command and the first chunk in it, through MCTP over PCIe.

First, the connection between the SAS initiator port and the SAS target port is established. For the SATA HDD the connection is between the HBA (STP initiator port) and the expander (STP target port).

Once the connection is established, the first chunk is written into the SATA HDD. Following that, the BMC issues subsequent SCSI ATA pass-through commands with download microcode ATA commands and the subsequent chunks in it through MCTP over PCIe and the connection, to update SATA HDD FW.

Once the update has been completed, the connection is terminated.

As discussed above with reference to the prior art, the HDD controller loads the FW image from flash to the memory, when the power is on, and the FW runs on the memory. When performing FW upgrade, the HDD controller receives uploading FW image via SCSI command (SCSI Write Buffer command or SCSI ATA pass-through command) and then programs it into flash. Thus, the in-band OS or application can still access HDD data since that access is also available via SCSI commands. However, the access SCSI commands may fail since the controller can only handle one SCSI command at a time. Accordingly, the HDD need not be put into an off-line mode.

Figure 4:
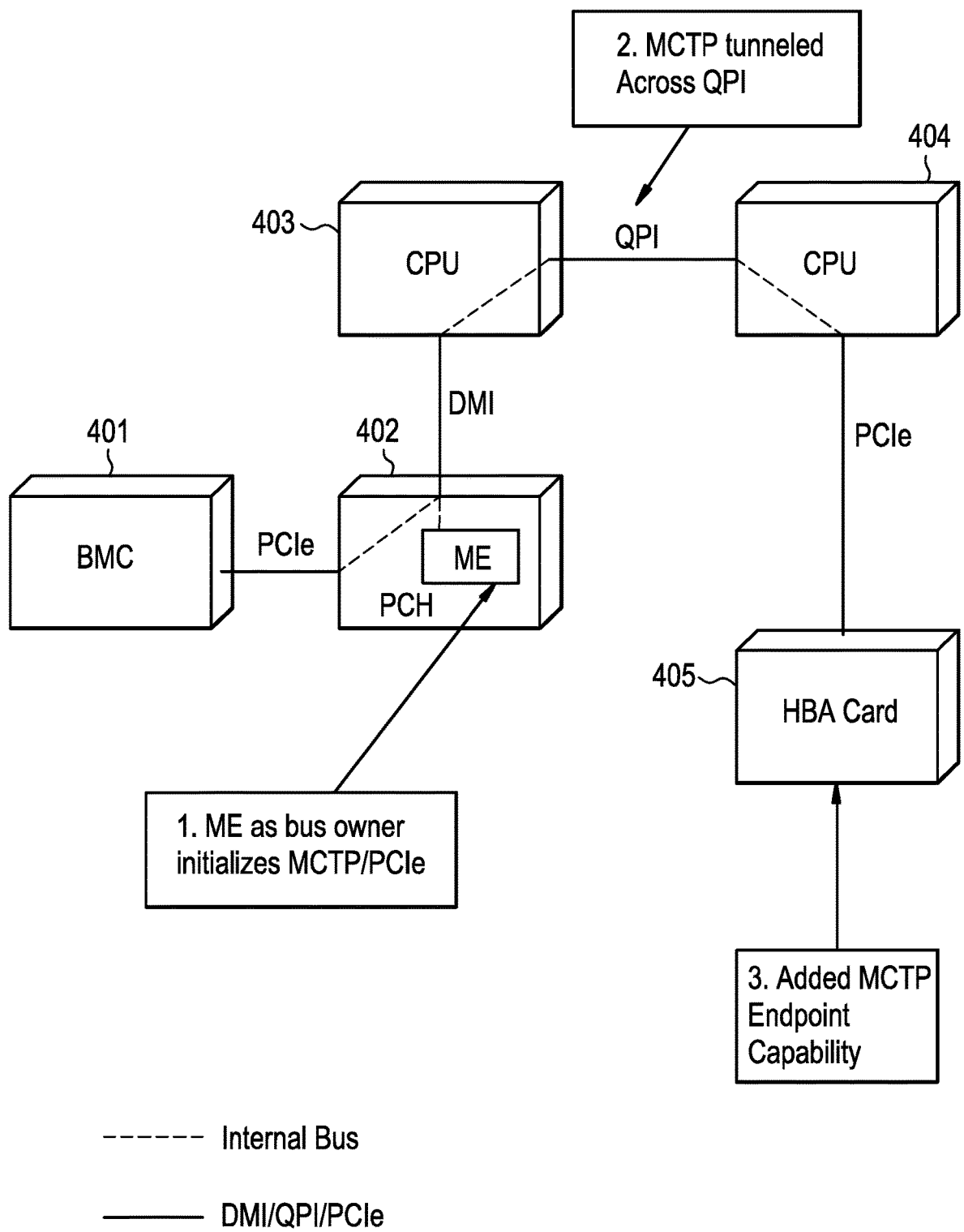
FIG. 4 illustrates communication flow per the Management component transfer protocol (MCTP) to support communication between different intelligent hardware components, according to another exemplary embodiment.

FIG. 4 illustrates communication flow per the MCTP to support communication between different intelligent hardware components, according to another exemplary embodiment.

DMTF (Distributed Management Task Force) defines the management interface MCTP to support the communications between different intelligent hardware components to make up a platform management subsystem. If both BMC and HBA support MCTP, then it can allow BMC to communicate with HBA via the MCTP convention over I2C or PCIe I/F. FIG. 4 depicts the communication between the BMC and the HBA via the MCTP convention over PCIe I/F.

If the communication is over I2C, there is a direct connection between BMC and HBA. If, on the other hand, the communication is over PCIe, as shown in FIG. 4, the communication can go back and forth between the different components.

The management engine, as the bus owner, initializes the MCTP/PCIe. Once the communication is over PCIe, the BMC 401 can communicate back and forth with the PCH 402, the PCH can communicate back and forth with the CPU 403, 404 and the CPU 403, 404 can communicate back and forth with the HBA card 405, which comprises MCTP endpoint capability. QuickPath Interconnect (QPI) or Ultra-Path Interconnect (UPI) which are point-to-point processor interconnect technologies developed by Intel Corporation of Santa Clara Calif., may be used for communication between multiple CPUs 403, 404, according to an exemplary embodiment. However, any other point-to-point processor interconnect technologies can be used in the various embodiments without limitation. The communication between the PCH and the CPU may be performed via direct media interface (DMI), according to an exemplary embodiment.

Figure 5:
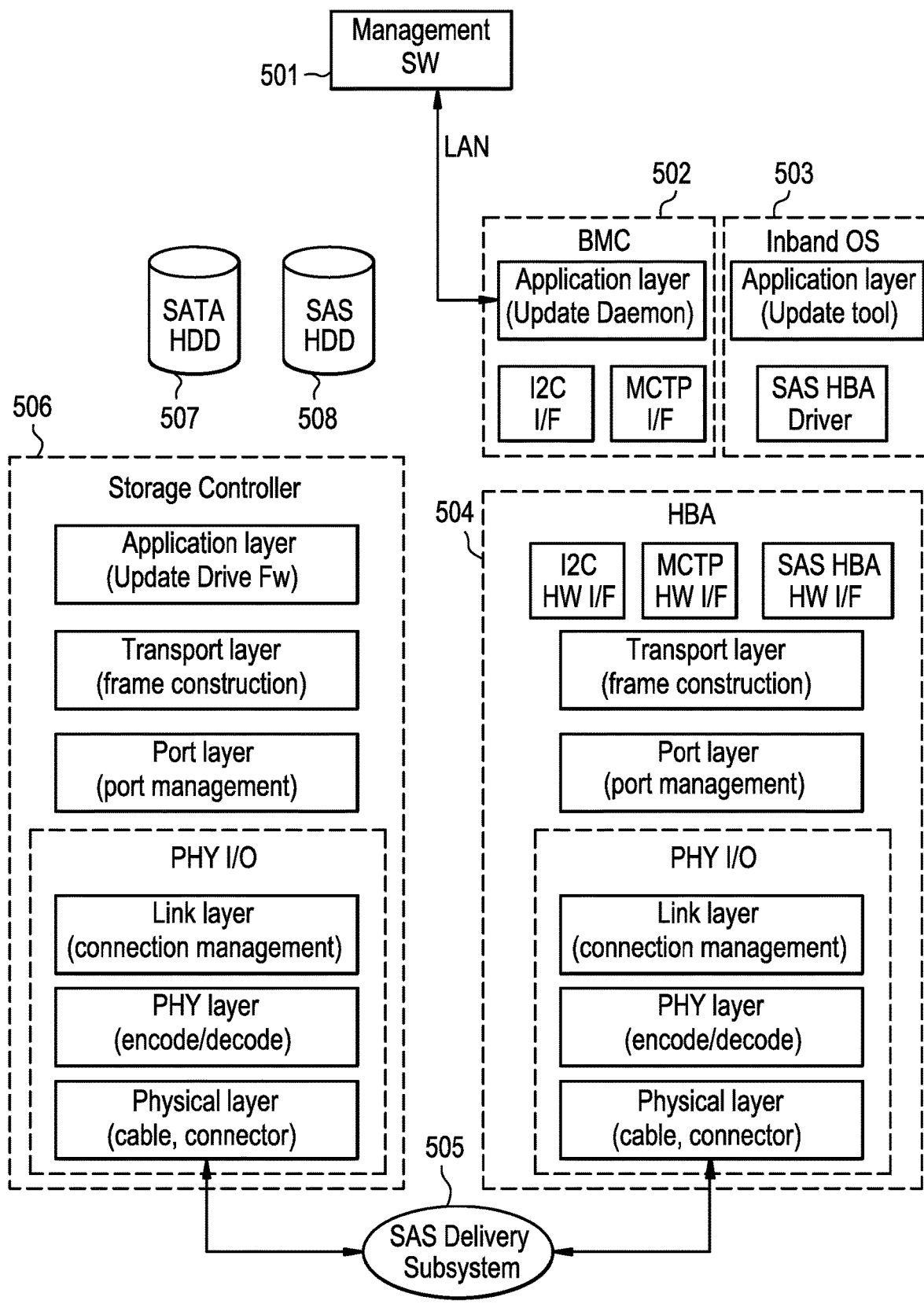
FIG. 5 illustrates a block diagram of an example system for updating HDD FW via BMC.

FIG. 5 illustrates a block diagram of an example system for updating HDD FW via BMC.

The system described in the current disclosure incorporates an application layer which comprises a BMC 502 and an in-band OS 503. As is described above, the management software (SW) 501 may load the HDD FW on to the BMC 502 via a LAN connection, according to an exemplary embodiment.

The various exemplary embodiments discussed in this disclosure focus overcoming the shortcomings of the conventional technology by providing a system for updating HDD FW without having to deal with several different kinds of OS, in order to prevent dealing with multiple complications and management problems, by using the BMC OOB to update the HDD FW.

As can be seen in FIG. 5, the BMC comprises an I2C as well as an MCTP interface which in-turn communicates with the interface of the HBA 504 comprising the transport and the port layer.

In the present technology, there is OOB standard for communication between HBA 504 and BMC 502 through I2C I/F and PCIe I/F. Accordingly, the disclosure defines the upper layer application which issues the SAS standard SCSI command to update the SAS/SATA HDD FW. Thus, using the BMC OOB to update HDD FW from BMC OOB, as described in detail above with reference to FIGS. 3 and 4, and depicted in the block diagram of FIG. 5 is an easy solution to overcome the problems faced by the conventional art.

The difference between I2C I/F and PCIe I/F is that bandwidth of I2C I/F is much lower than PCIe I/F, leading to a much longer update time.

The HBA 504 further comprises the PHY input/output (I/O) which further incorporate the lower layers i.e., the link layer for connection management, the PHY layer for encoding and decoding, and the physical layer for cable/connector.

The SAS delivery subsystem 505 allows for communication between the PHY I/O of the HBA 504 and the storage controller 506, as is well known in the art. The storage controller further incorporates an application layer which updates the hard disk drive 507, 508 firmware.

The time-chart depicted in FIG. 6 and the flow chart depicted in FIG. 7 will be used hereinbelow to further explain the process of updating the HDD FW using the BMC OOB.

Figure 6:
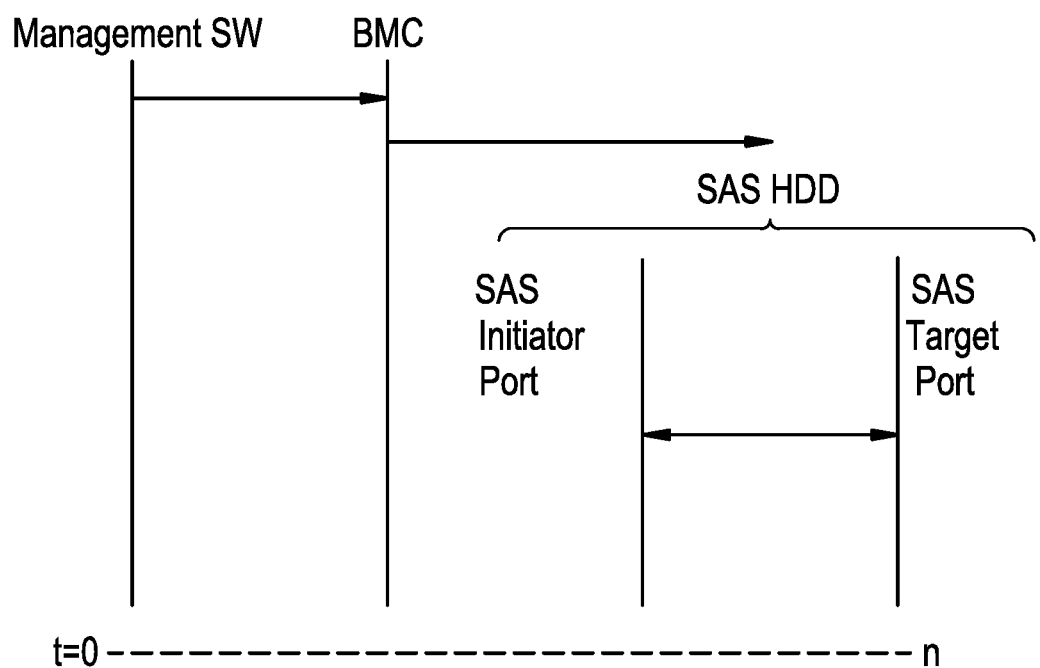
FIG. 6 depicts a time-chart illustrating the flow of communication between the different hardware components for updating the HDD FW using BMC.

FIG. 6 depicts a time-chart illustrating the flow of communication between the different hardware components for updating the HDD FW using BMC.

The time-chart depicted in FIG. 6 starts with the communication between the management SW and the BMC at time t=0. This initial communication relates to uploading the HDD FW to the BMC and may be performed using a LAN.

The BMC then communicated with the SAS HDD to update the HDD FW. The process for updating the HDD FW varies as described above with reference to FIGS. 3-5, based on the protocols being used and the means in which the communication is carried out.

The BMC initially checks to make sure the HDD FW is working without any issues and then begins to break down the FW into a plurality of chunks.

The BMC finally issues the appropriate command, based on the channel through which the command is being sent, to write the plurality of chunks on to the HDD.

As is shown in the time-chart of FIG. 6, a communication is established between the SAS initiator port and the SAS target port prior to the first of the plurality of chunks is written into the HDD.

FIG. 7 depicts a flow chart describing the process for updating the HDD FW using BMC OOB.

As can be seen in FIG. 7, the process starts with communication between the management SW and the BMC in step 701. The management SW uploads the HDD FW onto the BMC. This upload may occur via LAN according to an exemplary embodiment. In step 702, the BMC checks the FW to make sure there are no errors and that the FW is ready for upload.

The BMC then breaks down the FW into a plurality of chunks to be uploaded onto the HDD in step 703.

On the HDD, a connection is formed between the SAS initiator port and the SAS target port in step 704. The composition of the SAS initiator port and the SAS target port is dependent on the type of HDD. For an SAS HDD, the SAS initiator port is formed by the HBA and the SAS target port is formed by the SAS HDD. On the other hand, for a SATA HDD, the SAS initiator port is formed by the HBA and the SAS target port is formed by the expander, according to an exemplary embodiment.

Following the formation of the connection between the SAS initiator port and the SAS target port, the BMC issues a write command to write the plurality of chunks of the FW onto the HDD in step 705. The type of write command is dependent on the kind of HDD being updated. If SAS HDD is being updated, the BMC issues a SCSI write buffer command. If a SATA HDD is being updated, the BMC issues a SCSI ATA pass-through command with download microcode ATA command.

Following the issuance of the appropriate command, the plurality of chunks of the FW are written into the HDD and the HDD FW is updated 706.

The various illustrative logical blocks, modules, and circuits described in connection with the disclosure herein can be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration.

The operations of a method or algorithm described in connection with the disclosure herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

In one or more exemplary designs, the functions described can be implemented in hardware, software, firmware, or any combination thereof. If implemented in software, the functions can be stored on or transmitted over as one or more instructions or code on a non-transitory computer-readable medium. Non-transitory computer-readable media includes both computer storage media and communication media including any medium that facilitates transfer of a computer program from one place to another. A storage media can be any available media that can be accessed by a general purpose or special purpose computer. By way of example, and not limitation, such computer-readable media can include RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of non-transitory computer-readable media.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

What is claimed is:

1. A method of updating a serial attached small computer system interface (SAS) hard disk drive (HDD) firmware (FW) using a management controller (MC), the method, performed by the MC, comprising:
   uploading the SAS HDD FW via a local area network (LAN);
   breaking the SAS HDD FW into a plurality of chunks, and issuing a first small computer system interface (SCSI) Write Buffer Command with the first chunk to a SAS initial port prior to establishing a connection between the SAS initial port and a SAS target port;
   writing the first chunk into the SAS HDD once the connection between the SAS initial port and the SAS target port is established: and
   following the writing of the first chunk into the SAS target port, issuing subsequent SCSI Write Buffer commands with the remaining chunks from the plurality of chunks, the subsequent SCSI Write Buffer commands being issued one by one, each subsequent SCSI Write Buffer command corresponding to a respective one of the remaining chunks from the plurality of chunks; and
   writing each respective one of the remaining chunks from the plurality of chunks into the SAS HDD.

2. The method of claim 1, further comprising establishing a connection between the SAS initial port and the SAS target port.

3. The method of claim 1, wherein the first and subsequent SCSI Write Buffer commands with the corresponding first and remaining chunks are issued through an inter-integrated circuit (I2C).

4. The method of claim 1, further comprising:
   determining if the update of the SAS HDD FW is complete; and
   terminating the connection between the SAS initial port and the SAS target port based on the determination that the update of SAS HDD FW is complete.

5. The method of claim 1, wherein the first and subsequent SCSI Write Buffer commands with the corresponding first and remaining chunks are issued through a Management Component Transfer Protocol (MCTP) over Peripheral Component Interconnect Express (PCIe).

6. The method of claim 5, further comprising:
   determining if the update of the SAS HDD FW is complete; and
   terminating the connection between the SAS initial port and the SAS target port based on the determination that the update of SAS HDD FW is complete.

7. The method of claim 1, wherein if the SAS HDD FW is going through an Expander, the establishing step comprises establishing the connection between the SAS initial port and the SAS target port through the Expander.

8. A system for updating a serial attached small computer system interface (SAS) hard disk drive (HDD) firmware (FW) comprising:
   a management controller (MC);
   the SAS HDD FW; and
   a management software (SW),
   wherein the management SW. when executed by a processor, is configured to upload the SAS HDD FW to the MC; and
   wherein the MC is configured to break the uploaded SAS HDD FW into a plurality of chunks and to issue a first small computer system interface (SCSI) Write Buffer command with the first chunk to a SAS initial port prior to establishing a connection between the SAS initial port and a SAS target port; and wherein the first chunk is written into the SAS HDD once the connection between the SAS initial port and the SAS target port is established; and
   following the writing of the first chunk into the SAS target port, to issue subsequent SCSI Write Buffer commands with the remaining chunks from the plurality of chunks, the subsequent SCSI Write Buffer commands being issued one by one, each subsequent SCSI Write Buffer command corresponding to a respective one of the remaining chunks from the plurality of chunks; and
   to write each respective one of the remaining chunks from the plurality of chunks into the SAS HDD.

* * * * *